United States Patent [19]

Schwabel

[11] Patent Number: 4,744,802
[45] Date of Patent: May 17, 1988

[54] PROCESS FOR DURABLE SOL-GEL PRODUCED ALUMINA-BASED CERAMICS, ABRASIVE GRAIN AND ABRASIVE PRODUCTS

[75] Inventor: Mark G. Schwabel, Cottage Grove, Minn.

[73] Assignee: Minnesota Mining and Manufacturing Company, St. Paul, Minn.

[21] Appl. No.: 1,329

[22] Filed: Jan. 7, 1987

Related U.S. Application Data

[63] Continuation of Ser. No. 728,852, Apr. 30, 1985, abandoned.

[51] Int. Cl.$^4$ ................................ C09C 1/68
[52] U.S. Cl. ................... 51/309; 252/315.7; 264/60; 501/12; 501/153
[58] Field of Search ............. 51/293, 309; 252/315.7; 264/60; 501/12, 118, 153

[56] References Cited

U.S. PATENT DOCUMENTS

| | | | |
|---|---|---|---|
| 3,808,015 | 4/1974 | Seufert | 106/65 |
| 4,181,532 | 1/1980 | Woodhead | 106/40 |
| 4,252,544 | 2/1981 | Takahashi | 51/309 |
| 4,308,088 | 12/1981 | Cherdron et al. | 51/309 |
| 4,314,827 | 2/1982 | Leitheiser et al. | 51/309 |
| 4,390,583 | 6/1983 | Brazel | 264/60 |
| 4,416,840 | 11/1983 | Lee et al. | 264/60 |
| 4,518,397 | 5/1985 | Leitheiser et al. | 51/293 |
| 4,543,107 | 9/1985 | Rue | 51/309 |
| 4,574,003 | 3/1986 | Gerk | 51/309 |
| 4,623,364 | 11/1986 | Cottringer et al. | 51/309 |

FOREIGN PATENT DOCUMENTS

| | | |
|---|---|---|
| 0152768 | 8/1985 | European Pat. Off. . |
| 0172764 | 2/1986 | European Pat. Off. . |
| 2099012 | 12/1982 | United Kingdom . |

OTHER PUBLICATIONS

"Application of Sol-Gel Processes to Industrial Oxides", Jan. 13, 1968, Chemistry and Industry, pp. 48-51.

"Enhanced Densification of Boehmite Sol-Gels by Alumina Seeding", Nov. 1984, Communications of the American Ceramic Society, Kumagi & Messing.

"Alpha Alumina Formation in Alum-Derived Gamma Alumina" by F. W. Dynys & J. W. Halloran, *Journal of the American Ceramic Society*, vol. 65, No. 9, pp. 422-448, Dec. 1982.

Fetterolf, R. N., Development of High Strength, High Modulus Fibers, Technical Report AFML-TR-70-197, Aug. 1970.

*Primary Examiner*—Paul Lieberman
*Assistant Examiner*—Willie J. Thompson
*Attorney, Agent, or Firm*—Donald M. Sell; James A. Smith; Richard Francis

[57] ABSTRACT

A sol-gel process of producing durable alpha alumina-based ceramic particularly useful as abrasive grain from alpha alumina monohydrate is improved by the addition of a nucleating agent. Improved abrasive products containing the durable ceramic abrasive grains are also provided.

42 Claims, No Drawings

PROCESS FOR DURABLE SOL-GEL PRODUCED ALUMINA-BASED CERAMICS, ABRASIVE GRAIN AND ABRASIVE PRODUCTS

This is a continuation of application Ser. No. 728,852, filed Apr. 30, 1985, now abandoned.

TECHNICAL FIELD

This invention relates to the production of durable alumina-based ceramic materials which are useful as, among other things, abrasive grains from an improved sol-gel process.

BACKGROUND ART

The preparation by a sol-gel process of dense, alumina-based ceramic abrasive grain is known. U.S. Pat. No. 4,314,827 describes a process of making an abrasive mineral employing chemical ceramic technology by gelling alumina monohydrate with a precursor of at least one modifying component followed by dehydration and firing. A preferred method of addition of the modifying component is in the form of a soluble salt such as magnesium nitrate. Other disclosures in this area include U.S. Pat. No. 4,181,532, "Application of Sol-Gel Processes to Industrial Oxides", Jan. 13, 1968, *Chemistry and Industry*, and the following United States patent applications, all of which are assigned to the assignee of the present application:

M. A. Leitheiser et al, Ser. No. 495,179, filed May 17, 1983, entitled "Non-fused Aluminum Oxide-Based Abrasive Mineral".

These references disclose techniques for making alumina based ceramic material useful as abrasive grains. The ceramic material which results from most, if not all, of these processes is generally characterized by having identifiable "domains" formed of collections of usually similarly oriented crystals of alpha alumina. These domains typically have average diameters on the order of 10 micrometers or larger, with the smallest average diameter being about 6 micrometers.

Other references disclose the enhanced densification of alumina sol-gels by alpha alumina seeding. For example, M. Kumagai and G. L. Messing spoke at the American Ceramic Society meeting on May 2, 1984 on this subject and later caused the publishing of a paper in November, 1984 in *Communications of the American Ceramic Society* entitled "Enhanced Densification of Boehmite Sol-Gels by α-Alumina Seeding". Other references on this subject include an article entitled, "Alpha Alumina Formation in Alum-Derived Gamma Alumina" by F. W. Dynys and J. W. Halloran *Journal of the American Ceramic Society*, Vol. 65, No. 9, p. 442–448, December, 1982, and several papers presented Feb. 25–Mar. 1, 1985 at the Second International Conference on Ultra Structure Processing of Ceramics, Glasses and Composites, including the following: R. Roy et al. of Pennsylvania State University "Nucleation and Epitaxial Growth in Di-Phasic Gels"; and G. Messing et al. of Pennsylvania State University "Transformation and Sintering of Seeded Boehmite Gels".

SUMMARY OF THE INVENTION

According to this invention, the formation of an alumina-based ceramic particularly useful as abrasive grain, by a sol-gel process, the process comprising:

1. Preparing a dispersion of alpha aluminum oxide monohydrate;
2. Gelling the dispersion;
3. Drying the gelled dispersion to form a solid;
4. Calcining the solid; and
5. Sintering the solid;

is improved by introducing nucleating sites into the dispersion before the drying step.

The introduction into the dispersion of nucleating sites results in a finished alumina-based ceramic material having a greater durability than a comparable ceramic material prepared without nucleating sites. As a result, the products produced by this invention generally demonstrate greater fracture toughness and exhibit increased performance when used as abrasive grain.

The ceramic of the present invention comprises alpha alumina having a alpha ferric oxide nucleating agent dispersed therein. In some cases it is not possible to actually identify particles of the nucleating agent in the alpha alumina even though they are present, but the products according to the invention are readily identifiable because of the size of the aforementioned domains. Products of the invention have domains having an average diameter of less than about 5 micrometers, more frequently less than about 2 micrometers.

The invention also provides novel abrasive products which contain abrasive grain, at least a portion of which is the improved sol-gel abrasive grain of the present invention. Preferred abrasive products are coated abrasives, bonded abrasives, such as abrasive grinding wheels, and lofty nonwoven abrasives.

DETAILED DESCRIPTION OF THE INVENTION

Process Steps and Materials

The preparation of alumina-based ceramic materials from a sol-gel process usually begins with the preparation of a dispersion comprising from about 2 to almost 60 weight percent alpha aluminum oxide monohydrate (boehmite). The boehmite can either be prepared from various techniques well known in the art or can be acquired commercially from a number of suppliers. Examples of commercially available materials include Disperal ®, produced by Condea Chemie, GMBH and Catapal ® SB, produced by Vista Chemical Company. These aluminum oxide monohydrates are in the alpha-form, are relatively pure (including relatively little, if any, hydrate phases other than monohydrates), and have a high surface area. The physical properties of the final fired product will generally depend upon the type alumina monohydrate chosen for the dispersion. For example, when separate batches are made from Disperal ® and Catapal ® and identically processed, the Disperal ® batch will result in a higher density product with less tendency for open porosity than that of the Catapal ® batch.

The dispersion may contain a precursor of a modifying additive which can be added to enhance some desirable property of the finished product or increase the effectiveness of the sintering step. These additives are in the form of soluble salts, typically water soluble, and typically consist of a metal-containing compound and can be a precursor of the oxides of magnesium, zinc, cobalt, nickel, zirconium, hafnium, chromium and titanium. The exact proportions of these components that are present in the dispersion are not critical to this invention and thus can vary to convenience.

A peptizing agent is usually added to the boehmite dispersion to produce a more stable hydrosol or colloidal dispersion. Monoprotic acids or acid compounds which may be used as the peptizing agent include acetic, hydrochloric, formic and nitric acid. Nitric acid is a preferred peptizing agent. Multiprotic acids are normally avoided since they rapidly gel the dispersion making it difficult to handle or mix in additional components. Some commercial sources of boehmite contain an acid titer (such as absorbed formic or nitric acid) to assist in forming a stable dispersion.

The dispersion can be formed by any suitable means which may simply be the mixing of aluminum oxide monohydrate with water containing a peptizing agent or by forming an aluminum oxide monohydrate slurry to which the peptizing acid is added. Once the dispersion is formed, it preferably is then gelled. The gel can be formed by any conventional technique such as the addition of a dissolved or dispersed metal containing modifying additive, e.g., magnesium nitrate, the removal of water from the dispersion or some combination of such techniques.

Once the gel has formed, it may be shaped by any convenient method such as pressing, molding or extrusion and then carefully dried to produce an uncracked body of the desired shape.

If an abrasive material is desired, the gel can be extruded or simply spread out to any convenient shape and dried, typically at a temperature below the frothing temperature of the gel. Any of several dewatering methods, including solvent extraction, can be used to remove the free water of the gel to form a solid.

After the solid is dried, it can be cut or machined to form a desired shape or crushed or broken by any suitable means, such as a hammer or ball mill, to form particles or grains. Any method for comminuting the solid can be used and the term "crushing" is used, to include all such methods.

After shaping, the dried gel can then be calcined to remove essentially all volatiles and transform the various components of the grains into ceramics (metal oxides). The dried gel is generally heated to a temperature between about 400° C. and about 800° C. and held within this temperature range until the free water and over 90 weight percent of any bound water is removed.

The calcined material is then sintered by heating to a temperature of between about 1200° C. and about 1650° C. and held within this temperature range until substantially all of the alpha alumina monohydrate is converted to alpha alumina. Of course, the length of time to which the ceramic must be exposed to the sintering temperature to achieve this level of conversion will depend upon various factors but usually from about 5 to about 30 minutes is sufficient.

Other steps can be included in this process, such as rapidly heating the material from the calcining temperature to the sintering temperature, sizing granular material, centrifuging the dispersion to remove sludge waste, etc. Moreover, this process can be modified by combining two or more of the individually described steps, if desired.

These conventional process steps and materials are more fully described in pending U.S. application Ser. No. 606,500 entitled, "Process for Improved Densification of Sol-Gel Produced Alumina-Based Ceramics", by A. P. Gerk, and this application is here incorporated by reference.

The most significant aspect of this invention is the deliberate introduction of nucleating sites into the aluminum oxide monohydrate dispersion. The presence of nucleating sites in the dispersion results in a ceramic material which has smaller domains, producing a more durable ceramic.

One of the most preferred agents which can be employed to introduce the nucleating sites into the dispersion is particulate alpha alumina, preferably as an aqueous slurry. The amount of particulate alpha alumina can vary considerably. Suitable nucleation has been obtained with amounts varying from about 0.01% to about 50% by weight based on the total weight of the ceramic, although amounts outside of this range are also thought to be useful. The particle size of the particles of alpha alumina may also vary considerably. Particle sizes varying from about 80 to about 700 nm have been found to be useful, but smaller and larger particles are also thought to be useful. The particle size distribution of the nucleating agent is also thought to be relatively unimportant although it is preferred to remove coarse particles which would tend to settle from the dispersion.

The source of the alpha alumina particles is relatively unimportant. Commercially available particulate alpha alumina such as that available from Sumitomo Chemical Co. Ltd. under the designation AKP-50, having an average particle size of about 280 nm, and from Reynolds Metals Co. under the designation RC-HP-DBM, having an average particle size of 320 nm, are suitable. The alpha alumina particles may also be generated in situ, for example, by ball milling the dispersion in an alpha alumina ceramic container with alpha alumina balls or with at least one of these and a container or balls made of another material, or by ball milling any other source of alpha alumina with other types of container or balls than those which would provide alpha alumina.

Other useful nucleating agents include alpha ferric oxide ($Fe_2O_3$) or precursors of alpha alumina or alpha ferric oxide which convert respectively to alpha alumina or alpha ferric oxide at a temperature below the temperature at which alumina monohydrate would transform to alpha alumina. Other useful nucleating agents are contemplated.

The useful nucleating agents are generally alpha alumina, materials which convert to alpha alumina or materials which are crystallographically similar to alpha alumina, as is the case with alpha ferric oxide. The domains are thought to be created for the most part around each nucleating particle by the growth of collections of alpha alumina crystals on facets of the particle with such collections generally surrounding the nucleating particle.

The improved ceramic material according to the invention may have a density varying from near its theoretical density, e.g., 95% or greater, to about 75%. The ceramic material may be substantially void free or it may be characterized by including porosity, typically in the form of internal vermicular or equiaxial pores which are for the most part on the interior of the ceramic with a minor part of the pores extending to the surface. Porosity is very difficult to measure accurately by conventional porosity measuring techniques because the porosity is a mix of closed pores which do not extend to the surface and open pores which do. Closed porosity does not appear to have an adverse affect on the durability of the ceramic and, in fact, has been noted to provide improved abrasive performance.

The ceramic material of the present invention may be used in areas where conventional ceramics are used and particularly where a more durable ceramic is needed. Ceramic abrasive grains according to the invention may also be used in conventional abrasive products, preferably as a blend with less expensive conventional abrasive grain, such as fused aluminum oxide, silicon carbide, garnet, fused alumina-zirconia and the like.

The following examples are illustrative of certain specific embodiments of this invention; however, these examples are for illustrative purposes only and are not to be construed as limitations upon the invention.

SPECIFIC EMBODIMENTS

EXAMPLE 1

The embodiment of Example 1 was prepared by dispersing 164.8 grams of alpha alumina monohydrate in 2069 ml of 75° C. water. The alpha alumina monohydrate was boehmite having an average crystal size of about 3.3 nm, a BET surface area of 190 m$^2$/gr (BET after heating to 600° C.) and major impurities being 0.35 wt. % $SiO_2$, 0.21 wt. % $SO_4$ and 0.006 wt. % $Na_2O$. The dry alpha alumina monohydrate contained 0.06 moles of $HNO_3$ per mole of A100H and was 98% by weight dispersible in water. This mixture was then blended for 20 minutes to form a slurry, after which 6.4 milliliters of concentrated (70%) nitric acid was added as a peptizing agent. The resulting mixture was blended an additional 20 minutes to form a sol. The sol was transferred to a polyethylene ball mill jar containing ceramic media (balls) where it was ball milled overnight, about 16 hours.

A modifying additive was added with gentle stirring to the ball milled dispersion in the form of a solution containing the equivalent of 7.5 grams of magnesium oxide as magnesium nitrate formed by reaction of magnesium hydroxide and nitric acid in aqueous solution resulting in a rapid increase in viscosity which is indicative of gelling. This preparation produces a fired sample containing approximately 6 percent magnesium oxide and 94 percent aluminum oxide.

The gel was then spread in glass trays at approximately 2 cm in depth and placed in an 85° C. preset oven for approximately 16 hours. The dry gel was then hand crushed with a mortar and pestle and screened to a 20 to 54 mesh (U.S. Standard) size fraction.

The crushed dried gel was then placed in 150 ml Pyrex® glass beakers and calcined to 600° C. for 30 minutes in an electric furnace to remove water and nitrates. After calcining, the material was fired by placing a 10 gm sample contained in a platinum crucible directly in a preheated electric furnace at the firing temperatures shown in Table I. After holding for 10 minutes, the platinum crucible was removed and the sample allowed to air cool to ambient temperature.

The apparent specific gravity (ASG) of each sintered specimen was measured using ethyl benzene displacement in a pycnometer. The ASG of the ceramic of these examples at the various firing temperatures is also shown in Table I.

TABLE 1

| Firing Temperature (°C.) | ASG (g/cc) |
|---|---|
| 1350 | 3.70 |
| 1400 | 3.66 |
| 1450 | 3.76 |
| 1500 | 3.70 |

A control example, hereinafter Control A, was prepared in the same manner except eliminating the ball milling operation and replacing it with a step that envolved stirring the dispersion on a hot plate, holding the dispersion at 60° C. with continuous stirring for 16 hours. The resulting fired ceramic, fired at 1400° C. had an ASG of 3.63 g/cc and at 1450° C. had an ASG of 3.46 g/cc, producing a much less dense ceramic than the nucleated ceramics produced at the same firing temperatures as described in Example 1.

EXAMPLE 2

Example 2 is the same as Example 1 except Condea Chemie Disperal® alpha aluminum oxide monohydrate was used. The ceramic fired at 1400° C. had an ASG of 3.80 g/cc.

EXAMPLE 3

Example 3 is the same as Example 2 except the additive material, magnesium nitrate, was eliminated. The unmodified alumina ceramic produced by firing at 1400° C. had an ASG of 3.825 g/cc.

EXAMPLE 4

Example 4 is the same as Example 2 except half of the initial water, 1015 ml, and 9 ml of the concentrated nitric acid were first milled in the ball mill for 16 hours to in situ generate nucleating particles in this solution and the milled water-acid was decanted from larger fragments and the decanted liquid added to 164 g of Condea Chemie Disperal® alumina monohydrate which had been dispersed in the 1015 ml balance of the water. The resulting sol was then transferred to a glass beaker and gently stirred while the magnesium nitrate solution prepared as described in Example 1 was added. Ceramic fired at 1400° C. had an ASG of 3.75 g/cc.

As is evident from the data in Table I and Examples 2-4, the addition of nucleating agent to the alpha alumina monohydrate dispersion significantly increases the density of the fired ceramic.

EXAMPLES 5-61

ABRASIVE DISC TEST

The abrasive grains of Examples 5-9 and 11-61 were used to make 17.75 cm (7-inch) diameter coated abrasive discs. The abrasive grains for each disc consisted of a 1:1 by weight mixture of 30-35 mesh (average diameter 550 microns) and 35-40 mesh (average diameter 460 microns) screen cuts obtained using U.S. Standard Screens. The discs were prepared using conventional coated abrasive making procedures, conventional 0.76 mm vulcanized fiber backings and conventional calcium carbonate-filled phenolic resin make and size resins, without adjusting for mineral density differences. The make resin was precured for 75 minutes at 88° C. The size resin was precured for 90 minutes at 88° C. followed by a final cure of 100° C. for 10 hours. Conventional one-trip coating techniques and curing in a forced air oven were employed. The coating weights (wet basis) were as follows:

| Coating | Coating Weight (g/cm$^2$) |
|---|---|
| make | 0.017 |
| size | 0.052 |
| mineral | 0.073 |

The resultant cured discs were first conventionally flexed to controllably crack the hard bonding resins, mounted on a beveled aluminum back-up pad, and used to grind the face of 1.25 cm × 18 cm 1018 cold rolled steel workpiece. The disc was driven at 5000 rpm while the portion of the disc overlying the beveled edge of the back-up pad contacted the workpiece at a pressure of 0.91 kg/cm$^2$, generated a disc wear path of about 140 cm$^2$. Each disc was used to grind 12 separate workpieces for 1 minute each. The relative cumulative cut of the 12 cuts for each disc, using the cumulative cut of a disc made using brown fused alumina abrasive grain as 100%, is tabulated in Table VI.

EXAMPLE 5

A ceramic material formed entirely of alumina monohydrate-derived alpha alumina and alpha alumina nucleating particles was prepared. The amount of materials for this and for subsequent examples may be found in Table II which follows the remaining examples.

Room temperature deionized water, 16N analytical reagent grade nitric acid and alpha alumina monohydrate powder sold under the trade designation Disperal ® were charged into a 6 liter stainless steel vessel of a "Waring" industrial type blender and dispersed therein at high speed for 3 minutes. The dispersion was transferred to a batch type centrifuge and centrifuged for 15 minutes at 1300 times the force of gravity, and the supernatant removed. The supernatant and 16 grams of a previously produced alpha alumina suspension were mixed at high speed for 1 minute in the 6 liter stainless steel vessel of the "Waring" blender. The alpha alumina suspension had been produced by charging 2 liters of deionized water acidified to a pH of 2.7 with 16N reagent grade nitric acid and 2 kilograms of alpha alumina powder sold by Sumitomo Chemical Co. Ltd. under the designation AKP −50. The suspension had a particle size of 280 nanometers as determined by dynamic light scattering by using a NiComp Model 200 Laser Particle Sizer. The sol/suspension, after mixing, was poured into 33 cm×23 cm×5 cm glass trays and placed in a forced air oven heated at 100° C. to gel and dry. Drying was continued until less than 10% volatiles and granules and pieces up to 3 cm in diameter remained. The dried material was then crushed using a Braun pulverizer type UD having a 1.1 mm gap between the steel plates. The crushed material was screened and particles of about 0.5 mm to about 1 mm was retained for firing.

The screened, crushed material was fed into the end of a calciner formed of a 23 cm diameter 4.3 meter long stainless steel tube having a 2.9 meter hot zone. The tube was inclined at 2.4° with respect to the horizontal and rotated at 7 rpm for use. Calcining residence time was about 15 minutes. The feed end of this calciner hot zone was 350° C. with the exit end being 800° C. The fired product from this calciner was fed directly into a 1380° C. kiln formed of a 8.9 cm diameter 1.3 meter long silicon carbide tube having a 76 cm hot zone. The tube was inclined at 4.4° with respect to the horizontal and rotated at 10.5 rpm for use. Firing residence time was about 5 minutes.

The product, white granules composed of alpha alumina, exited the 1380° C. kiln into room temperature air, forming a small mound on a tray where it was allowed to cool to room temperature.

The microstructure of the ceramic product was examined. No domains could be resolved using transmitted polarized light microscopy at 1000 times magnification, indicating a domain size less than about 1½ micrometers. Scanning electron microscopy (SEM) of etched samples of the ceramic and transmission electron microscopy (TEM) of thinned foils of these materials revealed domains less than 2 micrometers in diameter and with an average domain diameter of about 1 micrometer consisting of agglomerates of alpha alumina microcrystals having low angle grain boundaries. Vermicular porosity within and between the microcrystals was also observed to fill about 10 percent of the volume within the sample.

EXAMPLE 6

This example illustrates the effect of using a different commercial alpha alumina. The procedure follows that of Example 5 except the suspension of Sumitomo AKP-50 alpha alumina was replaced with 19 g of a suspension prepared from 825 g deionized water acidified to pH 2.7 and 700 g of alpha alumina containing 0.05 wt % MgO available from Reynolds Metals Co. under the designation RC-HP-DBM with 0.05% MgO. This dispersion was charged into a 1.5 liter vessel of an "Oster" blender and dispersed therein at high speed for 1 minute.

Optical, SEM and TEM examination of a sample of this ceramic revealed a microstructure substantially the same as the ceramic of Example 5 except the domain size was about 1.5 micrometer.

EXAMPLE 7

This example reveals the effect of eliminating the step of centrifuging the alumina monohydrate dispersion prior to mixing with the nucleating agent and adding MgO modifier as magnesium nitrate. Six separate batches of the alpha alumina monohydrate dispersion-alpha alumina suspension were prepared, each according to Example 5, but eliminating the step of centrifuging the alumina monohydrate dispersion. The six batches were combined and the resultant dispersion and a 38% magnesium nitrate solution were metered through an in-line mixer to produce a gel which was dried in 5.5 cm×46 cm×65 cm aluminum trays, calcined and fired.

Transmitted polarized light microscopy at 1000 times magnification revealed no discernable structure, indicating a domain size less than about 1½ micrometers. SEM examination of etched surfaces and TEM examination of thin foils of this sample of this ceramic revealed about 0.6 to about 1.3 micron domains consisting of agglomerates of alpha alumina microcrystals. The alpha alumina microcrystals were about 80 to 400 nanometers in average diameter. Spinel microcrystals averaged about 80 to 150 nanometers and were present between the alumina microcrystals and between the domains. Vermicular porosity, typically about 25 nm in diameter and up to about 450 nm long, existed between microcrystals and domains. Smaller more equiaxed porosity averaging about 25 nm in diameter was present within the alpha alumina microcrystals.

EXAMPLE 8

This example repeats Example 6, using Reynolds Metals Co. RC-HP-DBM-0.05% MgO alpha alumina, eliminating the centrifuging step and adding MgO as magnesium nitrate.

The microstructure of the resultant ceramic was substantially the same as that of the ceramic of Example 7, except the domain size averaged about 0.6 to 1.5 micrometers.

EXAMPLE 9

Alumina monohydrate sol Disperal ® was dispersed in acidified water and centrifuged as described in Example 5. The resultant supernatant and a solution containing 25 wt % magnesium nitrate and 9.7 wt % ferric nitrate were metered through an in-line mixer to form a gel. The resulting gel was dried, crushed, and screened as in Example 6. The screened 0.5 to 1 mm crushed material was then transferred to 5 cm×10 cm×20 cm mullite trays and annealed in air at 400° C. for 24 hours. This annealed material was then fed into the calciner and fired as in Example 5.

The fired material was a mix of white and light olive grits. The olive grits were selected for microstructure analysis. No resolvable structure was seen using transmitted polarized light microscopy at 1000×, indicating a domain size less than 1½ micrometers. SEM and TEM analysis showed domains averaging about 1 to 1.5 micrometer in diameter. The alpha alumina crystals within these domains averaged 350 nm and had higher angle boundaries than in Example 5. Spinel crystals averaging about 100 nm, but as large as about 200 nm, were present between the domains and between the alumina microcrystals. Porosity was less prevalent than in Example 6.

EXAMPLE 10

This example illustrates the use of a zirconia modifier. A 50% aqueous suspension of alpha alumina was made by combining in a Waring blender 100 g Sumitomo AKP-50 alpha alumina, 100 g deionized water, and 1 g 16N nitric acid. This suspension was mixed with a 28% solids Disperal ® alumina monohydrate sol producing a sol containing 5 wt % alpha alumina. Zirconyl acetate solution (26% $ZrO_2$ solids) was passed through an ion exchange column to remove sodium and calcium ions. The resultant zirconyl acetate solution was pumped into a Lightnin ® brand mixer where it was thoroughly mixed with the alpha alumina nucleated alumina monohydrate sol to give an $Al_2O_3$ to $ZrO_2$ ratio of 4:1. The mixture initially exited the mixer as a fluid which was collected in glass trays and which, after about five minutes, set as a gel. The gel was dried in a forced air dryer at 95° C. The dried material was then crushed in a Braun brand pulverizer, calcined at 600° C. in a rotary tube calcining furnace, and then fired at 1380° C. in a rotary tube sintering furnace. X-ray diffraction analysis of the mineral showed the presence of alpha alumina and zirconia primarily as tetragonal with a minor amount of monoclinic.

A −30 +40 mesh screen (U.S. Standard) (average particle size 500 micrometers) cut of this abrasive grain was coated on a backing in a manner similar to that described in the aforementioned Abrasive Disc Test to provide an abrasive disc. The make adhesive was as described in the Abrasive Disc Test. The size adhesive was a conventional mixture of $KBF_4$ and phenolic resin. The discs were used to abrade the 2.5 cm by 18 cm face of a 304 stainless steel workpiece using the conditions described in the Abrasive Disc Test except that the workpiece was ground until less than 10 g of metal was removed during a one minute grinding period.

Control abrasive discs were made in the same manner. Control B contained a commercial ceramic abrasive grain formed of a 93% alumina 7% MgO ceramic having an average domain size of about 10 micrometers made according to the description given in Example 22 of U.S. Pat. No. 4,314,827. Control C contained fused alumina abrasive grain.

| Disc Abrasive | Average Total Cut (g) | % of Control B |
|---|---|---|
| Example 10 | 203 | 145 |
| Control B | 140 | 100 |
| Control C fused alumina | 117 | 84 |

EXAMPLE 11

This example illustrates the use of ferric nitrate as a precursor for the nucleating agent, alpha ferric oxide. Alpha alumina monohydrate, deionized water and 16N nitric acid were dispersed in a continuous blender/disperser and the resultant sol centrifuged in a continuous centrifuge and the supernatant sol collected and mixed with a 10% ferric nitrate solution with agitation provided by an air motor-powered "Jiffy" brand mixer. The resultant sol was dried in a polyester-lined 5.5 cm×46 cm×65 cm aluminum tray, crushed, and screened, as described in Example 5, and calcined and fired as described in Example 9.

EXAMPLE 12

This example is similar to Example 11 except the amount of ferric nitrate was increased.

EXAMPLE 13

This example is similar to Example 11 except a greater amount of ferric nitrate was added by metering and in-line blending rather than by a batch process.

EXAMPLE 14

This example is similar to Example 11 except the alpha ferric oxide is added as such instead of as a precursor. The alpha alumina monohydrate sol was made as described in Example 11 and 0.2×0.02 micrometer alpha ferric oxide particles were dispersed in the sol at high speed for 10 minutes in the 6 liter stainless steel vessel of a "Waring" blender. The resultant sol was dried in polyester-lined trays, calcined and fired as described in Example 5.

EXAMPLES 15-17

These examples were prepared to verify nucleation at very low concentrations of nucleating agent. 2.5 liters of deionized water, 2.5 kilograms of Sumitomo Chemical Co. Ltd. AKP-50 alpha alumina powder and 9 g of 15N reagent grade nitric acid were dispersed at high speed for three minutes in the 6 liter stainless steel vessel of the "Waring" blender. The resultant suspension was centrifuged at 1000 times the force of gravity for 50 minutes and the supernatant removed. That supernatant was centrifuged at 1300 times the force of gravity for 50 minutes and its supernatant removed. The resultant supernatant was again centrifuged at 1300 times the force of gravity for 50 minutes. A portion of the latter supernatant was mixed using an air-powered "Jiffy" mixer with a sol prepared as described in Example 11 to provide weight percentages of alpha alumina; based on the weight of the $Al_2O_3$ in the alpha alumina monohydrate of 0.01% (Example 15), 0.05% (Example 16), and 0.25% (Example 17). The sols were dried in polyester-lined aluminum trays then calcined and fired as in Example 5.

EXAMPLE 18

This example and Example 19 were prepared to verify nucleating at a very high concentration of nucleating agent. 625 g of Sumitomo Chemical Co. Ltd. alpha alumina AKP-50, 3000 ml deionized water and 3.5 g of 16N regeant grade nitric acid were dispersed at high speed for 3 minutes in the 6 liter stainless steel vessel of a "Waring" blender. A portion of the resultant alpha alumina suspension was mixed using a "Jiffy" mixer with an alpha alumina monohydrate sol, described in Example 11, in an epoxy resin-lined 19 liter steel vessel. The sol/suspension was heated to 100° C. in the open vessel and stirred daily using the "Jiffy" mixer for 2 days until the sol/suspension thickened. The thickened composition was then placed in 6.6 cm×46 cm×65 cm polyester-lined trays, dried and fired as described in Example 5 to a ceramic.

EXAMPLE 19

A sol/suspension made as described in Example 18 was combined with a 38% magnesium nitrate solution using metering pumps and an in-line mixer to produce a gel which was dried in trays and processed as described in Example 5 to a ceramic.

EXAMPLE 20

This example is similar to Example 16 except the alpha alumina monohydrate/alpha alumina mixture and a 38% magnesium nitrate solution were metered through an in-line mixer to produce a gel that was dried in trays and calcined and fired to produce a ceramic.

EXAMPLE 21

This example is similar to Example 19 except the amount of alpha alumina added was decreased and a nickel nitrate solution was used as the modifying metal oxide precursor salt in place of the magnesium nitrate solution.

EXAMPLE 22

This example is the same as Example 21 except the added modifying metal oxide precursor was a cobalt nitrate solution.

EXAMPLE 23

This example is the same as Example 21 except the added modifying metal oxide precursor was a zinc nitrate solution.

EXAMPLE 24

A sol/suspension was produced as described in Example 18 except the heating in the 19 liter vessel was omitted. The sol-suspension was dried in trays and processed further as in Example 5 except the firing temperature was reduced to 1200° C.

EXAMPLE 25

Similar to Example 24 except that the firing temperature was raised to 1250° C.

EXAMPLE 26

Similar to Example 24 except that the firing temperature was raised to 1300° C.

EXAMPLE 27

Similar to Example 24 except that the sol/suspension was mixed with a 38% magnesium nitrate solution using metering pumps and an in-line mixer before the gel was placed in the trays to dry.

EXAMPLE 28

Similar to Example 27 except that the firing temperature was raised to 1250° C.

EXAMPLE 29

Similar to Example 27 except that the firing temperature was raised to 1300° C.

CONTROL EXAMPLE D

This example shows the effect of eliminating the nucleating agent. A control material was produced by drying a centrifuged sol prepared as described in Example 11 in a tray and processing further as described in Example 5 to a ceramic. Optical examination of the ceramic in transmitted polarized light revealed domains averaging 6 to 10 micrometers in diameter.

CONTROL EXAMPLE E

This ceramic material was produced commercially without the use of a nucleating agent based upon the description given in Example 22 of U.S. Pat. No. 4,314,827. Examination of this ceramic in transmitted polarized light reveals domains averaging 6 to 15 micrometers in dimeter.

EXAMPLES 30 to 59

Examples 30 to 59 were prepared by first preparing a sol/suspension by dispersing 12 liters of water, 240 g of 16N reagent grade nitric acid, an alpha alumina suspension and 4 kilograms of Disperal® alpha alumina monohydrate powder in a polyethylene-lined 19 liter vessel using an inserted high shear mixer (manufactured by Barrington Industries and sold as Model BJ-5C) for 3 minutes at high speed. Table III gives the size and amount of alpha alumina added. These sol/suspensions and 38% magnesium nitrate solutions were metered through an in-line mixer in the ratios given in Table III. The resulting gels were dried in 5.5 cm×46 cm×65 cm trays and processed from drying through calcining as described in Example 5. Firing was carried out at 1380° C. with the combined temperature rise and hold times given in Table III as the firing time.

The alpha alumina suspensions used in Examples 30–59 were produced by dispersing for 2 minutes at high speed 2.5 l deionized water, 7 g 16N nitric acid and 588 g of alpha alumina powder in the 6 liter stainless steel vessel of a Waring blender.

The alpha alumina powder used in Examples 30, 31, 48, 49, 50, and 53 through 59 was Reynolds Metals Co. RC-HP-DBM with 0.05% MgO.

The alpha alumina used in Examples 32–35 and 40–43 was Sumitomo Chemical Co. Ltd. AKP-50.

The alpha alumina used in Examples 36–39, and 44 through 47 was Sumitomo Chemical Co. Ltd. AKP-HP.

The alpha alumina used in Example 52 was Baikowski Internation Corp. "Baikalox" AS-2, CR-6.

The alpha alumina used in Example 51 was Sumitomo Chemical Co. Ltd AKP-50; dispersed as described, and then centrifuged at 1000 times, the force of gravity respectively for 10 minutes, 20 minutes, and 30 minutes with the supernatant only from each run being retained and used as the charge for the subsequent centrifuge run.

Firing, except as described directly below, was conducted at 1380° C. as described in Example 5, the only difference being the tube rotation speed and residence time as indicated.

Examples 30, 31, 48 through 56 and 59 were fired with the tube rotating at 2.5 rpm giving a 20 minute residence time.

Examples 32, 34, 36, 38, 40, 42, 44, and 46, were fired as described in Example 5 with a 5 minute residence time.

Example 57 was fired with the tube rotation at 19 rpm giving a 3 minute residence time.

Firing of the remaining Examples was carried out in an electrically heated box kiln by first placing the calcined material in two 5 cm×10 cm×20 cm mullite trays. In examples 33, 35, 37, 39, 41, 43, 45 and 47, the kiln was heated from room temperature to 1380° C. in 30 minutes and held at 1380° C. for 15 minutes. The power was then disconnected and the kiln was allowed to cool to room temperature. In Example 58, the kiln was heated from room temperature to 1380° C. in 120 minutes and then held at 1380° C. for 30 minutes before the power was disconnected and the kiln was allowed to cool to room temperature.

EXAMPLE 60

This example describes in situ preparation of the nucleating agent. 1.4 liters of deionized water, 18 g of 16N reagent grade nitric acid and 600 g of Disperal ® alpha alumina monohydrate were dispersed at high speed for 2 minutes in a 6 liter stainless steel vessel of a "Waring" blender. A portion of this dispersion sufficient to just cover 1.4 cm diameter flint glass balls ¾ filling a 1 gallon polyethylene bottle was added and the container capped. The container was used as a ball mill and rotated in the horizontal position for 24 hours with an outer surface speed of 58 cm/sec. The suspension recovered from the mill and 16N reagent grade nitric acid were charged into the "Waring" blender described above in the ratio of 2018 grams suspension to 20 grams of acid. The material was placed in glass trays, and dried and further processed as in Example 5.

EXAMPLE 61

This example is essentially the same as Example 60 except the dispersion was milled in a 750 ml polyethylene jar containing 500 1 cm diameter 18-8 stainless steel balls instead of glass balls in the larger bottle.

Tables IV and V reveal certain physical analysis of the ceramic materials. Table IV shows the density of the ceramic material as measured by conventional techniques using a helium stereopycnometer. Table V shows those examples according to the present invention which have average domain sizes of 5 micrometers or less, falling within the invention, and of the 6 micrometers to 15 micrometers, falling outside the scope of the present invention.

Table VI reveals the abrasiveness test results according to the Abrasive Disc Test hereinbefore described of certain of the examples as a percentage of the grinding result of an abrasive disc containing brown fused alumina abrasive particles.

TABLE II

| Example No. | Alumina Monohydrate (g) | Acid (g) | H$_2$O (ml) | Alpha Alumina Wt. (g) | Alpha Alumina Size (nm) | Modifier Precursors Mg(NO$_3$)$_2$.6H$_2$O (g) | Modifier Precursors Other | Modifier Precursors (g) | Al$_2$O$_3$ (Wt %) | MgO (Wt %) | Other Metal Oxide (Wt %) | Other Metal Oxide Type |
|---|---|---|---|---|---|---|---|---|---|---|---|---|
| 5 | 800 | 48 | 2400 | 8 | 280 | — | — | | 100 | — | — | |
| 6 | 800 | 48 | 2400 | 8 | 320 | — | — | | 100 | — | — | |
| 7 | 4800 | 288 | 14400 | 48 | 280 | 1132 | — | | 95.4 | 4.6 | — | |
| 8 | 4800 | 288 | 14400 | 48 | 320 | 827 | — | | 96.6 | 3.4 | — | |
| 9 | 800 | 48 | 2400 | — | — | 248 | Fe(NO$_3$)$_3$.9H$_2$O | 32 | 93 | 6 | 1 | Fe$_2$O |
| 10 | 933 | 30 | 2370 | 35 | 280 | — | HZrOOH(OOCCH$_3$)$_2$ | 290 | 80 | — | 20 | ZrO$_2$ |
| 11 | 800 | 48 | 3644 | — | — | — | Fe(NO$_3$)$_3$.9H$_2$O | 3.2 | 99.9 | — | 0.1 | Fe$_2$O$_3$ |
| 12 | 800 | 48 | 3644 | — | — | — | Fe(NO$_3$)$_3$.9H$_2$O | 32 | 99 | — | 1 | Fe$_2$O$_3$ |
| 13 | 800 | 48 | 3644 | — | — | — | Fe(NO$_3$)$_3$.9H$_2$O | 160 | 95 | — | 5 | Fe$_2$O$_3$ |
| 14 | 800 | 48 | 3644 | — | — | — | Fe$_2$O$_3$ | 13 | 98 | — | 2 | Fe$_2$O$_3$ |
| 15 | 800 | 48 | 3644 | 0.06 | 83 | — | — | | 100 | — | — | |
| 16 | 800 | 48 | 3644 | 0.3 | 83 | — | — | | 100 | — | — | |
| 17 | 800 | 48 | 3644 | 1.5 | 83 | — | — | | 100 | — | — | |
| 18 | 800 | 48 | 2678 | 600 | 280 | — | — | | 100 | — | — | |
| 19 | 800 | 48 | 2678 | 600 | 280 | 574 | — | | 92.1 | 7.9 | — | |
| 20 | 800 | 48 | 3644 | 0.3 | 83 | 9.5 | — | | 99.75 | 0.25 | — | |
| 21 | 800 | 48 | 3644 | 12 | 280 | — | Ni(NO$_3$)$_2$.6H$_2$O | 326 | 88 | — | 12 | NiO |
| 22 | 800 | 48 | 3644 | 12 | 280 | — | Co(NO$_3$)$_2$.6H$_2$O | 326 | 88 | — | 12 | CoO |
| 23 | 800 | 48 | 3644 | 12 | 280 | — | Zn(NO$_3$)$_2$.6H$_2$O | 333 | 87 | — | 13 | ZnO |
| 24, 25, 26 | 800 | 48 | 2678 | 12 | 280 | — | — | | 100 | — | — | |
| 27, 28, 29 | 800 | 48 | 2678 | 12 | 280 | 269 | — | | 93.4 | 6.6 | — | |
| Control D | 800 | 48 | 2678 | — | | — | — | | — | 100 | — | — |
| Control E | 800 | 48 | 2678 | — | | 287 | — | | 93 | 7 | — | |

TABLE III

| Example No. | Alpha Alumina size (nm)$^a$ | Alpha Alumina Wt (g)$^b$ | alpha alumina (wt %) | Ratio of Mg(NO$_3$)$_2$.6H$_2$O solution to sol/suspension | Firing Time (min) | Al$_2$O$_3$ (%) | MgO (%) |
|---|---|---|---|---|---|---|---|
| 30 | 312 | 447 | 2 | 0.068 | 20 | 98 | 2 |
| 31 | 312 | 447 | 2 | 0.068 | 20 | 98 | 2 |
| 32 | 260 | 163 | 0.7 | 0.025 | 5 | 99.3 | 0.7 |
| 33 | 260 | 163 | 0.7 | 0.025 | 45 | 99.3 | 0.7 |
| 34 | 260 | 1261 | 5.4 | 0.025 | 5 | 99.3 | 0.7 |

TABLE III-continued

| Example No. | Alpha Alumina size (nm)[a] | Wt (g)[b] | alpha alumina (wt %) | Ratio of Mg(NO$_3$)$_2$.6H$_2$O solution to sol/suspension | Firing Time (min) | Al$_2$O$_3$ (%) | MgO (%) |
|---|---|---|---|---|---|---|---|
| 35 | 260 | 1261 | 5.4 | 0.025 | 45 | 99.3 | 0.7 |
| 36 | 500 | 163 | 0.7 | 0.025 | 5 | 99.3 | 0.7 |
| 37 | 500 | 163 | 0.7 | 0.025 | 45 | 99.3 | 0.7 |
| 38 | 500 | 1261 | 5.4 | 0.025 | 5 | 99.3 | 0.7 |
| 39 | 500 | 1261 | 5.4 | 0.025 | 45 | 99.3 | 0.7 |
| 40 | 260 | 163 | 0.7 | 0.19 | 5 | 96 | 4 |
| 41 | 260 | 163 | 0.7 | 0.19 | 45 | 96 | 4 |
| 42 | 260 | 1261 | 5.4 | 0.19 | 5 | 96 | 4 |
| 43 | 260 | 1261 | 5.4 | 0.19 | 45 | 96 | 4 |
| 44 | 500 | 163 | 0.7 | 0.19 | 5 | 96 | 4 |
| 45 | 500 | 163 | 0.7 | 0.19 | 45 | 96 | 4 |
| 46 | 500 | 1261 | 5.4 | 0.19 | 5 | 96 | 4 |
| 47 | 500 | 1261 | 5.4 | 0.19 | 45 | 95 | 5 |
| 48 | 312 | 447 | 2 | 0.068 | 20 | 98 | 2 |
| 49 | 312 | 447 | 2 | 0.068 | 20 | 98 | 2 |
| 50 | 312 | 447 | 2 | 0.068 | 20 | 98 | 2 |
| 51 | 119 | 60[c] | 2 | 0.068 | 20 | 98 | 2 |
| 52 | 670 | 447 | 2 | 0.068 | 20 | 98 | 2 |
| 53 | 312 | 79 | 0.36 | 0.068 | 20 | 98 | 2 |
| 54 | 312 | 2692 | 10.9 | 0.068 | 20 | 98 | 2 |
| 55 | 312 | 447 | 2 | 0.012 | 20 | 99.6 | 0.4 |
| 56 | 312 | 447 | 2 | 0.41 | 20 | 89 | 11 |
| 57 | 312 | 447 | 2 | 0.068 | 3 | 98 | 2 |
| 58 | 312 | 447 | 2 | 0.068 | 150 | 98 | 2 |
| 59 | 312 | 447 | 2 | 0.068 | 20 | 98 | 2 |

[a] determined by Nicomp Model 200 Laser Particle Sizer
[b] weight of α Alumina suspension added
[c] Al$_2$O$_3$ dry weight

TABLE IV

| Example No. | density (g/cc)[1] |
|---|---|
| 5 | 3.6 |
| 6 | 3.5 |
| 7 | 3.5 |
| 8 | 3.5 |
| 9 | 3.8 |
| 30 | 3.5 |
| 31 | 3.5 |
| 32 | 3.7 |
| 33 | 4.0 |
| 34 | 3.6 |
| 35 | 3.9 |
| 36 | 3.9 |
| 37 | 4.0 |
| 38 | 4.0 |
| 39 | 4.0 |
| 40 | 3.5 |
| 41 | 3.8 |
| 42 | 3.6 |
| 43 | 3.8 |
| 44 | 3.5 |
| 45 | 3.9 |
| 46 | 3.7 |
| 47 | 3.9 |
| 48 | 3.6 |
| 49 | 3.6 |
| 50 | 3.6 |
| 51 | 3.9 |
| 52 | 3.5 |
| 53 | 3.4 |
| 54 | 3.8 |
| 55 | 3.5 |
| 56 | 3.7 |
| 57 | 3.5 |
| 58 | 3.8 |
| 59 | 3.5 |

[1] As determined by helium gas stereopycnometer

TABLE V

| Example No. | Domains averaging 6-15 micrometers | Domains averaging 5 micrometers |
|---|---|---|
| 5 | — | X |
| 6 | — | X |
| 7 | — | X |
| 8 | — | X |
| 9 | — | X |
| 10 | — | X |
| 11 | X | — |
| 12 | — | X |
| 13 | — | X |
| 14 | — | X |
| 15 | — | X |
| 16 | — | X |
| 17 | — | X |
| 18 | — | X |
| 19 | — | X |
| 20 | — | X |
| 21 | — | X |
| 22 | — | X |
| 23 | — | X |
| 24 | — | X |
| 25 | — | X |
| 26 | — | X |
| 27 | — | X |
| 28 | — | X |
| 29 | — | X |
| Control D | X | — |
| Control E | X | — |
| 30-61 | — | X |

TABLE VI

| Example No. | % Metal abraded compared to that abraded by brown fused alumina |
|---|---|
| 5 | 312 |
| 6 | 260 |
| 7 | 248 |
| 8 | 241 |
| 9 | 238 |
| 11 | 81 |
| 12 | 261 |
| 13 | 225 |
| 14 | 184 |
| 15 | 121 |
| 16 | 168 |
| 17 | 227 |

TABLE VI-continued

| Example No. | % Metal abraded compared to that abraded by brown fused alumina |
|---|---|
| 18 | 139 |
| 19 | 71 |
| 20 | 209 |
| 21 | 308 |
| 22 | 140 |
| 23 | 252 |
| 24 | 120 |
| 25 | 137 |
| 26 | 160 |
| 27 | 165 |
| 28 | 193 |
| 29 | 209 |
| Control D | 52 |
| Control E | 236 |
| 30 | 215 |
| 31 | 217 |
| 32 | 158 |
| 33 | 83 |
| 34 | 196 |
| 35 | 236 |
| 36 | 120 |
| 37 | 54 |
| 38 | 106 |
| 39 | 21 |
| 40 | 224 |
| 41 | 125 |
| 42 | 250 |
| 43 | 205 |
| 44 | 201 |
| 45 | 94 |
| 46 | 186 |
| 47 | 80 |
| 48 | 219 |
| 49 | 217 |
| 50 | 229 |
| 51 | 264 |
| 52 | 151 |
| 53 | 205 |
| 54 | 222 |
| 55 | 156 |
| 56 | 184 |
| 57 | 194 |
| 58 | 132 |
| 59 | 182 |
| 60 | 99 |
| 61 | 94 |
| Brown fused alumina control | 100 |

Although the invention has been described in considerable detail through the preceding examples, these examples are for the purpose of illustration only. Variations and modifications can be made by one skilled in the art without departing from the spirit and scope of the invention as described in the following claims.

We claim:

1. In the sol-gel process for forming alumina-based ceramic, the process comprising:
   a. preparing a dispersion of alpha alumina monohydrate particles;
   b. gelling the dispersion;
   c. drying the gel dispersion to form a solid;
   d. calcining the solid; and
   e. sintering the calcined solid, the improvement comprising introducing nucleating agents into the dispersion before the drying step by adding to the dispersion a nucleating agent selected from the group consisting of a precursor of alpha ferric oxide and alpha ferric oxide.

2. The process of claim 1 wherein the gel also contains a percursor of a modifying additive.

3. The process of claim 2 where the modifying additive is a metal-containing compound.

4. The process of claim 3 where the metal-containing compound is at least one precursor of the oxides of magnesium, zinc, cobalt, nickel, zirconium, hafnium, chromium and titanium.

5. The process of claim 1 where the nucleating agent is alpha ferric oxide.

6. The process of claim 1 where the nucleating sites are introduced by adding to the dispersion a precursor of alpha ferric oxide.

7. The process of claim 6 where the amount by weight of alpha ferric oxide is less than the amount by weight of alpha alumina monohydrate particles.

8. The process of claim 1 where the alumina-based ceramic is an abrasive grain.

9. The process of claim 1 including the step of crushing the calcined solid.

10. Alumina-based sol-gel ceramic comprising alpha alumina having alpha ferric oxide nucleating material dispersed therein.

11. The alumina-based sol-gel ceramic of claim 10 including a modifying additive.

12. The alumina-based sol-gel ceramic consisting essentially of alpha alumina having alpha ferric oxide nucleating material dispersed therein.

13. Abrasive grain comprising alumina-based sol-gel ceramic comprising alpha alumina having alpha ferric oxide nucleating material dispersed therein.

14. The abrasive grain of claim 13 including a modifying additive.

15. The abrasive grain of claim 13 consisting essentially of alpha alumina having alpha ferric oxide nucleating material dispersed therein.

16. An abrasive article comprising abrasive grain at least a portion of which comprises sol-gel abrasive grain comprising alpha alumina having alpha ferric oxide nucleating material dispersed therein.

17. An abrasive article of claim 16 where said sol-gel abrasive grain also includes a modifying additive.

18. An abrasive article comprising abrasive grain at least a portion of which comprises sol-gel abrasive grain consisting essentially of alpha alumina having alpha ferric oxide nucleating material dispersed therein.

19. The abrasive article of claim 16, 17 or 18 in the form of a coated abrasive product.

20. The abrasive article of claim 16, 17 or 18 in the form of a bonded abrasive product.

21. The bonded abrasive article of claim 19 in the form of a bonded abrasive wheel.

22. The abrasive article of claims 16, 17 or 18 in the form of a lofty non-woven abrasive product.

23. Alumina-based sol-gel ceramic comprising alpha alumina substantially in the form of domains which contain a nucleating amount of alpha ferric oxide and have an average diameter of less than about 5 micrometers.

24. The alumina-based sol-gel ceramic of claim 23 where said domains have an average diameter of less than about 2 micrometers.

25. The alumina-based sol-gel ceramic of claim 23 also including a modifying additive.

26. The alumina-based sol-gel ceramic of claim 23 consisting essentially of alpha alumina.

27. Abrasive grain comprising alumina-based sol-gel ceramic comprising alpha alumina substantially in the form of domains which contain a nucleating amount of alpha ferric oxide and have an average diameter of less than about 5 micrometers.

28. The abrasive grain of claim 27 where said domains have an average diameter of less than about 2 micrometers.

29. The abrasive grain of claim 27 also including a modifying additive.

30. The abrasive grain of claim 27 consisting essentially of alpha alumina and alpha ferric oxide.

31. An abrasive article including abrasive grain, at least a portion of which comprises the sol-gel abrasive grain of any one of claims 27, 28, 29 or 30.

32. An abrasive article including abrasive grain comprising the sol-gel abrasive grain of any one of claims 27, 28, 29 or 30 and any other type of abrasive grain.

33. A coated abrasive article including abrasive grain comprising the sol-gel abrasive grain of any one of claims 27, 28, 29 or 30.

34. A coated abrasive article including abrasive grain comprising the sol-gel abrasive grain of any one of claims 27, 28, 29 or 30 and any other type of abrasive grain.

35. A bonded abrasive product including abrasive grain comprising the abrasive grain of any one of claims 27, 28, 29 or 30.

36. A bonded abrasive product including abrasive grain comprising the abrasive grain of any one of claims 27, 28, 29 or 30 and any other type of abrasive grain.

37. A lofty nonwoven abrasive product including abrasive grain comprising the abrasive grain of any of one of claims 27, 28, 29 or 30.

38. The process of claim 1 including the step of shaping the gel before drying.

39. The process of claim 38 wherein said shaping is accomplished by extruding the gel.

40. The abrasive grain of claim 13 wherein said aluminabased ceramic is shaped.

41. An abrasive article comprising abrasive grain at least a portion of which is the abrasive grain of claim 40.

42. The abrasive article of claim 41 in the form of a coated abrasive product.

* * * * *

UNITED STATES PATENT AND TRADEMARK OFFICE
CERTIFICATE OF CORRECTION

PATENT NO. : 4,744,802

DATED : May 17, 1988

INVENTOR(S) : Mark G. Schwabel

It is certified that error appears in the above-identified patent and that said Letters Patent is hereby corrected as shown below:

Column 1, line 33, insert the following two paragraphs:

--A.P. Gerk, Serial No. 606,500, filed May 3, 1984, entitled "Process for Improvement Densification of Sol-Gel Produced Alumina-Based Ceramics," and
A.P. Gerk et al, Serial No. 666,133, filed October 30, 1984, entitled "Superior High Sodium and Calcined Abrasive and Process for its Production."--

Columns 13-14, line 59, the row beginning with the first "Control" (D) the following changes should be made:
under column "Size (nm)" insert -- -- --; under column "(g)" delete "--"; under column "$Al_2O_3$ (Wt %)" insert --100--; under column "MgO (Wt %)" delete "100" and insert in its place -- -- --; and under column "Type" delete "--".

Column 17, line 61, claim 1, the phrase beginning with "the improvement" should start a new line.

Column 17, line 62, claim 1, delete "agents" and insert in its place --sites--.

Column 20, line 17, claim 40, delete "aluminabased" and insert in its place --alumina-based--.

Signed and Sealed this

Twenty-third Day of May, 1989

Attest:

DONALD J. QUIGG

Attesting Officer

Commissioner of Patents and Trademarks